Figure 1:
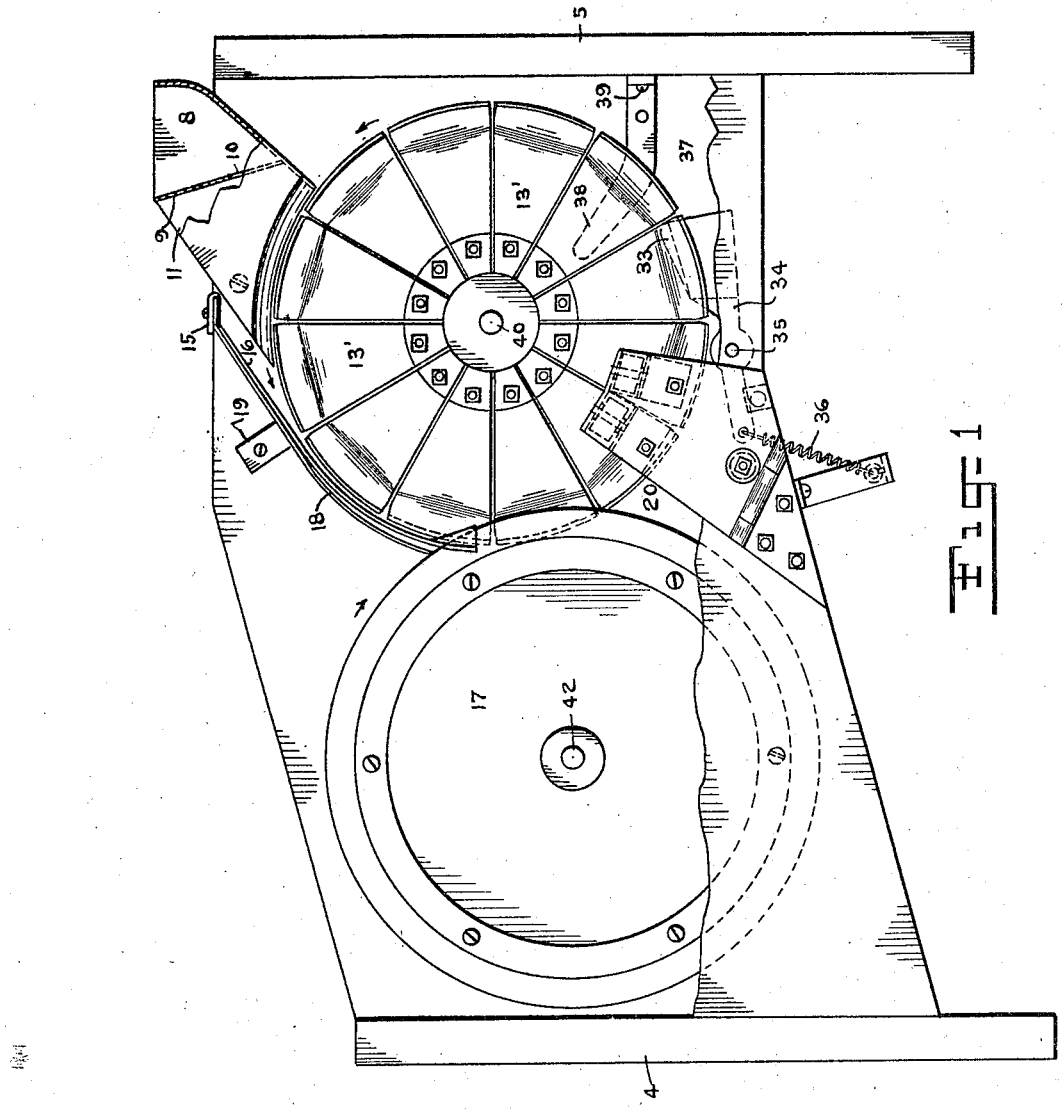

Oct. 2, 1923.  
J. GOTZHEIN  
1,469,332  
NUT SKINNING  
Filed April 21, 1923  
2 Sheets-Sheet 1

INVENTOR  
Joseph Gotzhein.  
BY  
Thomas A. Hill.  
ATTORNEY

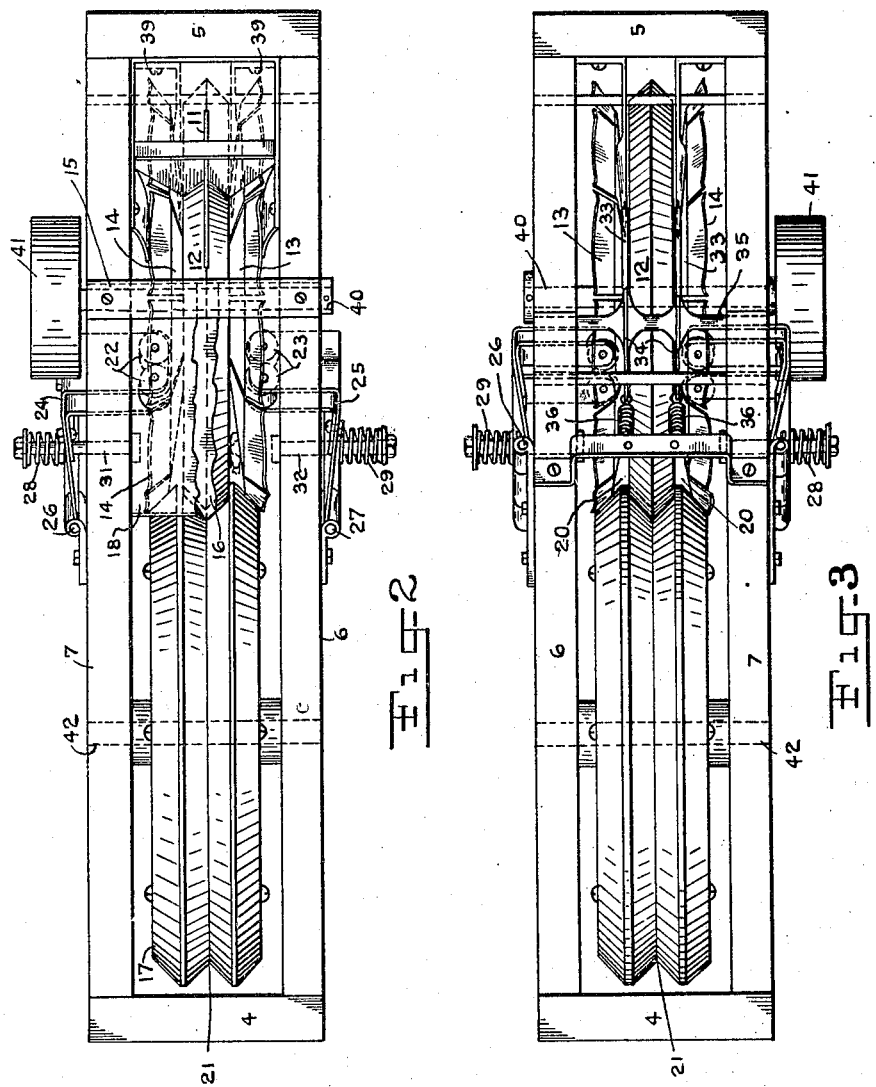

Patented Oct. 2, 1923.

1,469,332

UNITED STATES PATENT OFFICE.

JOSEPH GOTZHEIN, OF BROOKLYN, NEW YORK.

NUT SKINNING.

Application filed April 21, 1923. Serial No. 633,533.

*To all whom it may concern:*

Be it known that I, JOSEPH GOTZHEIN, a citizen of the Republic of Germany, residing at Brooklyn, in the county of Kings and State of New York, have invented certain new and useful Improvements in Nut Skinning, of which the following is a specification, reference being had therein to the accompanying drawing.

My invention relates to improvements in nut skinners and more particularly has reference to a device adapted to remove the skins from nuts such as almonds after they have been shelled. For this purpose it is customary to first steam or wet the shelled almonds so as to soften the skins upon the nuts, after which the nuts are fed to the skin removing apparatus and the skinned nuts and skins are separated.

Referring to the accompanying drawings, Fig. 1 illustrates in side elevation, parts being broken away, a suitable nut skinning apparatus embodying an application of my invention. Fig. 2 is a plan view looking down upon the same, and Fig. 3 is a view looking upwardly thereat.

4, 5 indicate the ends of the chamber, box, or frame of the apparatus, and 6, 7 the side walls thereof. 8 indicates the hopper in which the dampened shelled nuts are introduced the transverse partition 9 extending across the same, but being open at the bottom as indicated at 10 to allow for the passage of the nuts at either side of the central partition 11 where they pass around with the central wheel 12 and the resilient segmental side flanges thereof such as 13, 14. 15 indicates a suitable strap or bridge across the top of the chamber, the same being adapted to carry a strap of leather or other suitable material 16 which extends therefrom to a point between the wheel and flanges referred to and the forward wheel 17, and 18 indicates a cover or guard suitably secured by flanges such as 19 to the side walls 6, 7 for retaining the guide strap 16 in position. When the almonds drop in the peripheral grooves or spaces between the central wheel 12 having a convex periphery as indicated, and the resilient side flanges 13, the same are carried forward therebetween and beneath the guide strap 16 and pass between the outer tapered peripheral sides of the wheel 17 and said resilient sides 13, 14 which are pressed outwardly by contact with said wheel 17 and which as they leave the wheel 17 come together again, thereby retaining the nuts between said resilient sides and the sides of the central wheel 12, squeezing the same causing the skins to split and ejecting the nuts therefrom which fall downwardly through the space 20.

The resilient sides 13, 14 of the wheel 12 are preferably formed in segments such as 13' which project radially and outwardly from the centre of the wheel as shown to advantage in Fig. 1 and which flare outwardly at the outer ends as shown to advantage in Fig. 2, thus providing channels or peripheral recesses beneath the guide strap 16 through which the shelled nuts pass from the hopper 8, the guide strap 16 serving to keep the nuts properly in position and insuring their proper feed to the wheel 17 between the outer peripheral flange of which and the resilient segmental flanges 13, 14 the nut is pressed between the wheel 12 and segmental flanges 13, 14. The guide strap 16 serves to prevent the nuts from getting between the concave face of the wheel 21 and the convex face of the wheel 12, the object being to spread the flanges 13, 14 outwardly from the wheel 12, and allowing the nuts to be nipped between the same and the wheel 12, the effect of which is to squeeze or press the unskinned nut much the same as between the thumb and forefinger, thereby breaking the moistened skin and ejecting the nut therefrom through the space 20.

Should the nut fail to leave the skin for any reason, it continues around with the wheel 12 between the same and the resilient flanges which are subjected to further resilient pressure by means of the rollers 22, 23 retained in brackets 24, 25 hinged at 26, 27 and pressed inwardly by springs such as 28, 29 upon spindles such as 31, 32, and if this additional squeezing does not break the skin, the knives or razor blades such as 33 retained in the pivoted levers such as 34 mounted upon the shaft 35 and pressed inwardly by a spring such as 36, cuts the skin of the nut and ejects the same into the space 37. Fingers such as 38 which may be secured to the end of the chamber as indicated at 39 also project inwardly between the resilient walls 13, 14, and the wheel 12 to eject any remaining skins or nuts which may not have been shot clear of the wheel 12, thereby insuring the skinning of each nut irrespective of the size of the nut, and irrespective of the toughness or hardness of the skin thereof, the same when failing to skin in the first instance being subjected to repeated operations as aforesaid.

The wheel 12 is secured upon a suitable shaft such as 40 which in turn is provided with a pulley such as 41 which may be driven by belt or other suitable means, and the rotation of the wheel 12 is communicated to the wheel 17. From this it will be readily understood that any number of wheels such as 12 may be mounted upon a shaft such as 40 and driven thereby, and likewise any desired number of wheels such as 17 may be mounted upon a shaft such as 42, thereby compounding or extending the machine for greater capacity.

Of course it will be understood that various modifications may be made in the construction and arrangement of parts without departing from the spirit of the invention as claimed.

I claim:—

1. In a skinning device of the class described, a wheel having a resilient side, and means for feeding shelled nuts between said wheel and said resilient side, said means comprising a hopper at the feeding end, and a second wheel for pressing said nuts between said first mentioned wheel and said resilient side.

2. In a skinning device of the class described, a wheel having a resilient side, and means for feeding shelled nuts between said wheel and said resilient side, said means comprising a hopper at the feeding end, and a second wheel for pressing said nuts between said first mentioned wheel and said resilient side, and a guiding device between said hopper and said second wheel for directing the feed of said nuts.

3. In a skinning device of the class described, a wheel having a resilient side, and means for feeding shelled nuts between said wheel and said resilient side, a cutter for slitting the skins of said nuts, and an ejecting finger for clearing the same from between said wheel and said side.

4. In a skinning device of the class described, a wheel having a resilient side, and means for feeding shelled nuts between said wheel and said resilient side, a cutter for slitting the skins of said nuts, and an ejecting finger for clearing the same from between said wheel and said side, and resilient means for increasing the pressure upon said nuts before the same reach said cutter.

In testimony whereof I hereunto affix my signature.

JOSEPH GOTZHEIN.